P. W. PHILLIPS.

Assignor to D. Low, J. F. Almy and A. B. Russell.

Curtain Roller and Bracket.

No. 8,404. Reissued Sept. 10, 1878

Witnesses:

Geo. O. G. Coale

C. H. Glade

Inventor

Thomas W. Phillips by J. E. Maynadier

Attorney

UNITED STATES PATENT OFFICE.

PHINEAS W. PHILLIPS, OF SALEM, MASS., ASSIGNOR, BY MESNE ASSIGNMENTS, TO DANIEL LOW, JAMES F. ALMY, AND ALBERT B. RUSSELL.

IMPROVEMENT IN CURTAIN-ROLLERS AND BRACKETS.

Specification forming part of Letters Patent No. 114,036, dated April 25, 1871; Reissue No. 5,858, dated April 28, 1874; Reissue No. 8,404, dated September 10, 1878; application filed May 24, 1878.

*To all whom it may concern:*

Be it known that I, PHINEAS W. PHILLIPS, of Salem, in the county of Essex and State of Massachusetts, have invented a new and useful Improvement in Curtain-Fixtures, of which the following is a specification:

The main feature of my invention consists in arranging an automatic device to be used in connection with shade-rollers which are provided with a coiled spring, by which the shade is rolled up or balanced, so that when the roller is taken out of the brackets for any purpose the spring will be prevented from unwinding or running down—that is, the combination, with a spring curtain-fixture, of an automatic clutch which will prevent the spindle or shaft from revolving under the influence of the spring when the roller is held in the hand, and which will not interfere with the revolution of the roller when the spindle is held in the brackets.

The main difference between my improved spring curtain-fixture and all others known to me consists in this, that in all other fixtures using an automatic stop the function of the stop was to arrest the motion of the roller on the spindle or shaft as an axis, and thereby regulate the position of the curtain, while in my fixture its function is to prevent revolution of the spindle while the roller is held in the hand without interfering with the motion of the roller on the spindle as an axis.

A second feature of my invention consists in means for preventing end play of the spindle while in the brackets.

Figure 1:
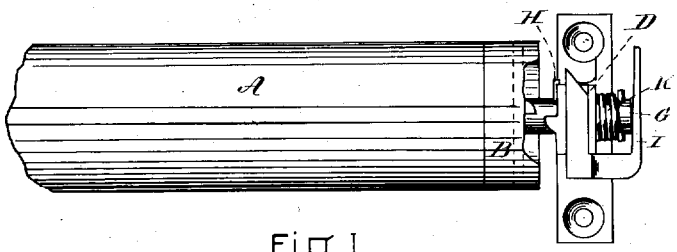
Figure 2:
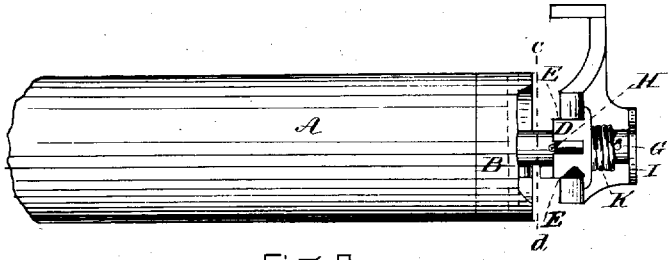
Figure 3:
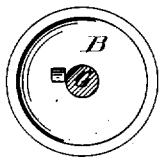
Figure 4:
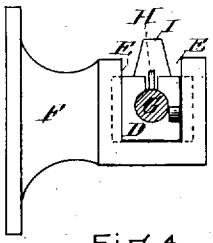

The drawing represents, in Figure 1, an elevation of the shade-roller and bracket. Fig. 3 represents a section on line *c d* of Fig. 2, which is a plan of the roller and bracket. Fig. 4 represents a section on line *c d* of Fig. 2, but looking toward the roller instead of toward the bracket.

Similar letters of reference indicate like parts in all the figures.

A represents the shade-roller. This roller has a cap or flange, B, made of metal, which, together with the collar or block D, forms the clutch.

D is a collar or block which enters the slot E formed on the bracket F when the fixture is in use.

The shaft of the shade-roller G passes through the collar D. This collar has a slot, through which extends the pin H. This slot permits the collar D to be moved toward and from the other member of the clutch on B, toward B to prevent the shaft G from revolving in the roller when the two parts of the clutch are in contact and away from B to permit the roller to revolve on the shaft B in order to wind up or unwind the curtain.

The end of shaft G is prevented from moving to the right, as shown in the drawings, by the upright I, which forms a part of the bracket; and the spring K, coiled around the shaft G between the pin in the end of the shaft and the collar D, holds the collar D against the sides of the slot E, so that the collar prevents the shaft moving to the left.

When the roller is taken out of the brackets the collar or block D is forced against the flange or cap B, engaging the clutch, and thereby holding the collar, shaft, and shade-roller in the same relative positions, and preventing the spring from being unwound by the revolution of the shaft in the roller.

The jaws of the slot E are inclined at the top, so as to guide the collar D into place between the jaws, thus releasing the clutch when the roller is put into the proper place in the bracket, and allowing the shade-roller to revolve, and at the same time forcing the shaft as far to the right as it will go and holding it from any motion toward the left, thereby preventing end play of the shaft, which is the object of the second part of my invention.

The collar or block D is shown as being made square; but it may be made round, and the shaft may be held in a slot formed in the upright I, the end of the shaft being made square for the purpose, accomplishing the same results.

What I claim as my invention is—

1. A spring shade-roller having an automatic clutch arranged to lock the shaft with the roller in all conditions of the latter when removed from the bracket, substantially as described.

2. In a spring shade-roller, the combination of the bracket, the collar, the shaft, and means for retaining the collar upon the shaft, whereby endwise motion of the shaft in the bracket is prevented, substantially as described.

PHINEAS W. PHILLIPS.

Witnesses:

HENRY M. MEEK,
ELLEN HANNAN.